Patented Nov. 20, 1945

2,389,128

UNITED STATES PATENT OFFICE 2,389,128

SULPHONES AND METHOD OF PREPARING SAME

Louis L. Bambas, Grosse Pointe Woods, Mich., assignor to Parke, Davis & Company, Detroit, Mich., a corporation of Michigan No Drawing. Original application December 13, 1941, Serial No. 422,904. Divided and this application June 13, 1944, Serial No. 540,139

6 Claims. (Cl. 260—239.6)

The invention relates to sulphones and their preparation.

This application is a division of my copending application, Serial No. 422,904, filed December 13, 1941.

This divisional application relates more particularly to sulphones having the general formula

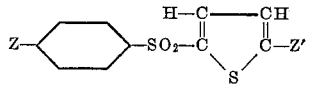

where Z and Z' are each a member of the class consisting of —NO₂, —NH₂ and groups hydrolyzable to —NH₂.

The new sulphones may be prepared from a thiophene compound of the formula

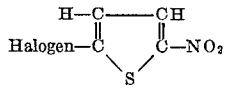

by a condensation with a sulphinic acid or salt thereof, of the formula

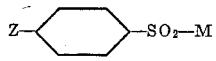

where M is —H or a metal. Thus M may be silver, lead sodium, and the like. The condensation is readily effected, preferably by heating in a solvent inert to the reactants. The resulting sulphone of formula

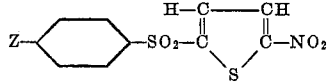

may then be reduced, as for example, with titanous chloride or powdered iron or by catalytic hydrogenation.

Alternatively, the compound of formula

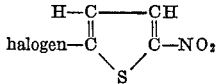

may be condensed with a mercaptan, or salt thereof, of the formula

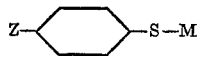

This condensation is likewise best conducted by heating the reactants in an inert solvent. The resulting sulphide can be converted into the corresponding sulphone of formula

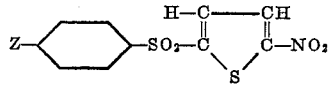

by oxidation, e. g., with hydrogen peroxide or with chromic acid. Since free amino groups are readily attacked by these reagents, the sulphide must be acylated prior to oxidation if Z is —NH₂

My invention may be further illustrated by the following example.

Example (a) 2-iodo-5-nitrothiophene, M. P. 75–78° C. is prepared by the nitration of 2-iodothiophene according to the directions of Rinkes, Rec. Trav. Chim. 53, 648 (1934).

(b) The sodium salt of p-acetylaminobenzene-sulphinic acid is prepared by dissolving 30 grams of the acid in 100 cc. of water containing sufficient sodium hydroxide to neutralize the acid. Then 30 grams of 2-iodo-5-nitrothiophene in 150 cc. of alcohol is added, and the mixture is refluxed for about ninety minutes. The crystalline precipitate of p-acetylaminophenyl-5' - nitro - 2'-thienyl sulphone is collected and recrystallized from isopropyl alcohol, M. P. 184–187° C.

(c) The above acetyl derivative is refluxed for fifteen minutes in alcoholic hydrochloric acid. Then an equal volume of water is added, and the mixture is made alkaline to litmus; the precipitate is collected and crystallized from isopropyl alcohol to give p-aminophenyl-5'-nitro-2'-thienyl sulphone, M. P. 159–162° C.

What I claim as my invention is:

1. A sulphone having the formula

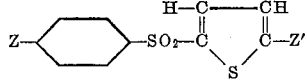

where Z and Z' are each a member of the class consisting of —NO₂, —NH₂ and groups hydrolyzable to —NH₂.

2. p-acetylaminophenyl - 5' - nitro - 2'-thienyl sulphone.

3. p-aminophenyl - 5 ' - nitro - 2' - thienyl sulphone.

4. Process for preparing a sulphone of the formula

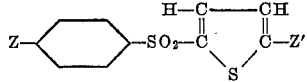

where Z and Z' are each a member of the class consisting of —NO₂, —NH₂ and groups hydrolyzable to —NH₂ which comprises reducing a sulphone of the formula

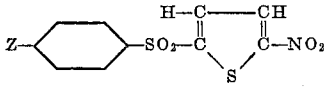

5. Process for preparing a sulphone of the formula

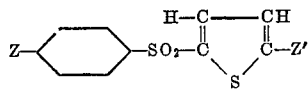

where Z and Z' are each a member of the class consisting of —NO₂, —NH₂ and groups hydrolyzable to —NH₂ which comprises condensing a compound of the formula

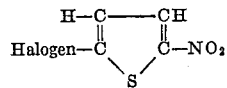

with a compound of the formula

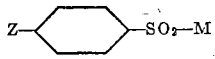

where M is a member of the class consisting of —H and a metal.

6. Process for preparing a sulphone of the formula

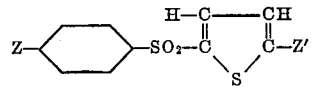

where Z and Z' are each a member of the class consisting of —NO₂, —NH₂ and groups hydrolyzable to —NH₂ which comprises condensing a compound of the formula

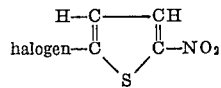

with a compound of the formula

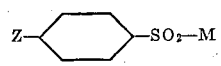

where M is a member of the class consisting of —H and a metal, and reducing the compound thus obtained to convert an —NO₂ group to an —NH₂ group.

LOUIS L. BAMBAS.